Figure 1:
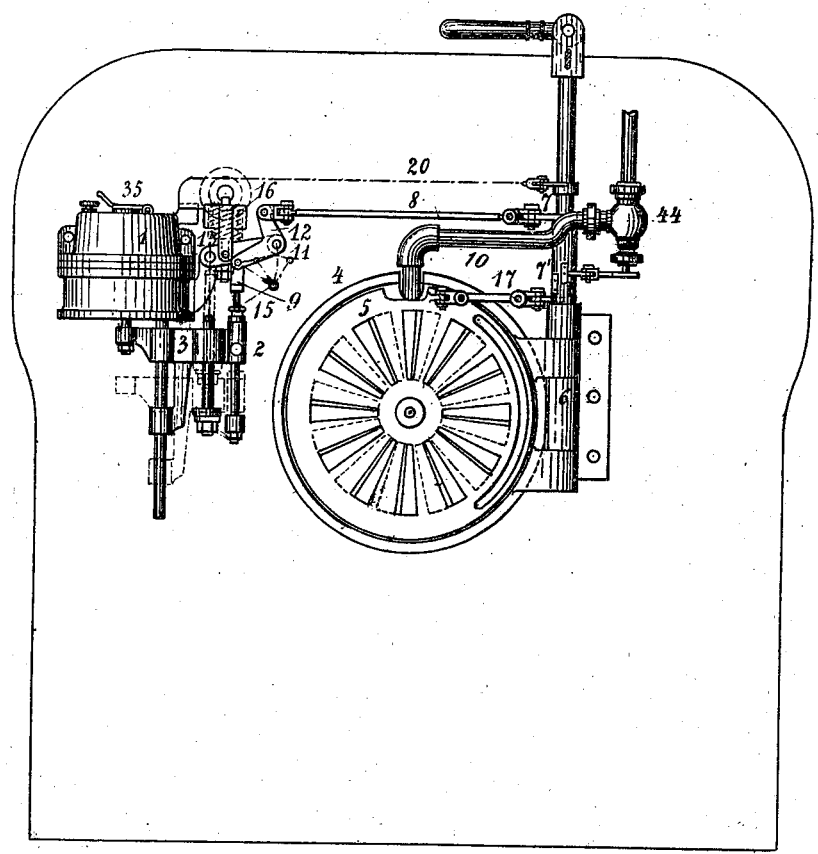

(No Model.) 6 Sheets—Sheet 1.
T. LANGER.
SMOKE CONSUMING APPARATUS FOR FURNACES.
No. 544,765. Patented Aug. 20, 1895.

(No Model.) 6 Sheets—Sheet 2.

T. LANGER.
SMOKE CONSUMING APPARATUS FOR FURNACES.

No. 544,765. Patented Aug. 20, 1895.

Witnesses:
Oscar Rothmund
Samuel Wertheim

Inventor
Theodor Langer
by Victor Fischl
Attorney (No Model.) 6 Sheets—Sheet 3.
T. LANGER.
SMOKE CONSUMING APPARATUS FOR FURNACES.

No. 544,765. Patented Aug. 20, 1895.

Witnesses:

Inventor
Theodor Langer
by Victor Fischler
Attorney (No Model.) 6 Sheets—Sheet 5.
T. LANGER.
SMOKE CONSUMING APPARATUS FOR FURNACES.

No. 544,765. Patented Aug. 20, 1895.

Witnesses:

Inventor
Theodor Langer
by
Attorney (No Model.) 6 Sheets—Sheet 6.

T. LANGER.
SMOKE CONSUMING APPARATUS FOR FURNACES.

No. 544,765. Patented Aug. 20, 1895.

Witnesses:

Inventor
Theodor Langer
by
Attorney

UNITED STATES PATENT OFFICE.

THEODOR LANGER, OF VIENNA, AUSTRIA-HUNGARY.

SMOKE-CONSUMING APPARATUS FOR FURNACES.

SPECIFICATION forming part of Letters Patent No. 544,765, dated August 20, 1895.

Application filed January 19, 1893. Serial No. 458,989. (No model.) Patented in Germany August 30, 1892, No. 71,876; in Switzerland August 30, 1892, No. 5,908; in France August 30, 1892, No. 224,044; in Belgium August 30, 1892, No. 101,186; in England August 30, 1892, No. 15,542; in Italy August 30, 1892, No. 32,576; in Spain August 30, 1892, No. 13,726; in Denmark August 30, 1892, No. 7; in Norway August 30, 1892, No. 3,853, and in Austria-Hungary September 25, 1893, XLIII, 3,693, XXVII, 3,629.

*To all whom it may concern:*

Be it known that I, THEODOR LANGER, a subject of the Emperor of Austria-Hungary, residing at Vienna, Austria-Hungary, have invented certain new and useful Improvements in Smoke-Consuming Apparatus for Furnaces, (for which I have obtained German Letters Patent, No. 71,876, dated August 30, 1892; Swiss Letters Patent, No. 5,906, dated August 30, 1892; French Letters Patent, No. 224,044, dated August 30, 1892; Belgian Letters Patent, No. 101,186, dated August 30, 1892; English Letters Patent, No. 15,542, dated August 30, 1892; Italian Letters Patent, No. 32,576, dated August 30, 1892; Spanish Letters Patent, No. 13,726, dated August 30, 1892; Danish Letters Patent, No. 7, dated August 30, 1892; Norwegian Letters Patent, No. 3,853, dated August 30, 1892, and Austria-Hungarian Letters Patent, Nos. 3,693 and 3,629, dated September 25, 1893,) of which the following is a specification.

My invention relates to smoke-consuming apparatus for furnaces in general and for locomotive-boilers in particular.

The objects of my invention are, first, to provide a simple, efficient, and comparatively inexpensive smoke-consuming apparatus adapted to be secured to the furnace of a boiler, whether said boiler is employed in conjunction with a stationary, locomotive, or marine engine; second, to provide in such an apparatus a regulator for controlling the inlet of air into the furnace above the grate and the admission of steam in conjunction with said air to assist the consumption of the products of combustion within said furnace; third, to provide in such an apparatus a regulator for controlling the inlet of air into the furnace above the grate by opening or closing suitable slides in the furnace-door or suitable traps in a flue or other air-space leading from the under-grate draft into said furnace above the grate; fourth, to provide in such an apparatus suitable means for opening or closing the door of a furnace automatically to increase or decrease the inlet of air into said furnace above the grate; fifth, to provide, in conjunction with apparatus of the character described, a furnace-door composed of a series of superposed guard-plates and provided with air-passages extending through said superposed plates; sixth, to provide in an apparatus of the character described an adjusting mechanism for partially or entirely transmitting the movements of the air-regulator, operated in conformity with predetermined stroke or speed, to suitable slides, registers, or the like, admitting air into the furnace above the grate; seventh, to provide in an apparatus of the character described, between the adjusting mechanism above referred to and the air-regulator, a brake to obtain a slower regulating-movement in said air-regulator when the draft is to be reduced—as, for instance, when the steam-regulating valve of a locomotive is closed; and, eighth, to provide in an apparatus of the character described steam-tubes of peculiar construction and having perforations adapted to throw jets of steam against the tube partition of a boiler on a line nearly parallel with the line or curve formed by the lowest row of tubes in said boiler.

My invention consists in the combination and arrangement of parts whereby the above-described objects are attained; and, further, it consists in the combination and arrangement of parts hereinafter described and claimed.

I have shown in the accompanying drawings my improved apparatus as applied to both locomotive and marine boilers, and in the latter example the draft is from beneath the grate of the furnace. It is, however, to be understood that the invention is equally applicable to all forms of boilers for stationary, locomotive, or marine service.

The nature and general features of my invention will be more fully understood from the following description, taken in connection with the accompanying drawings, forming part hereof, and in which—

Figure 2:
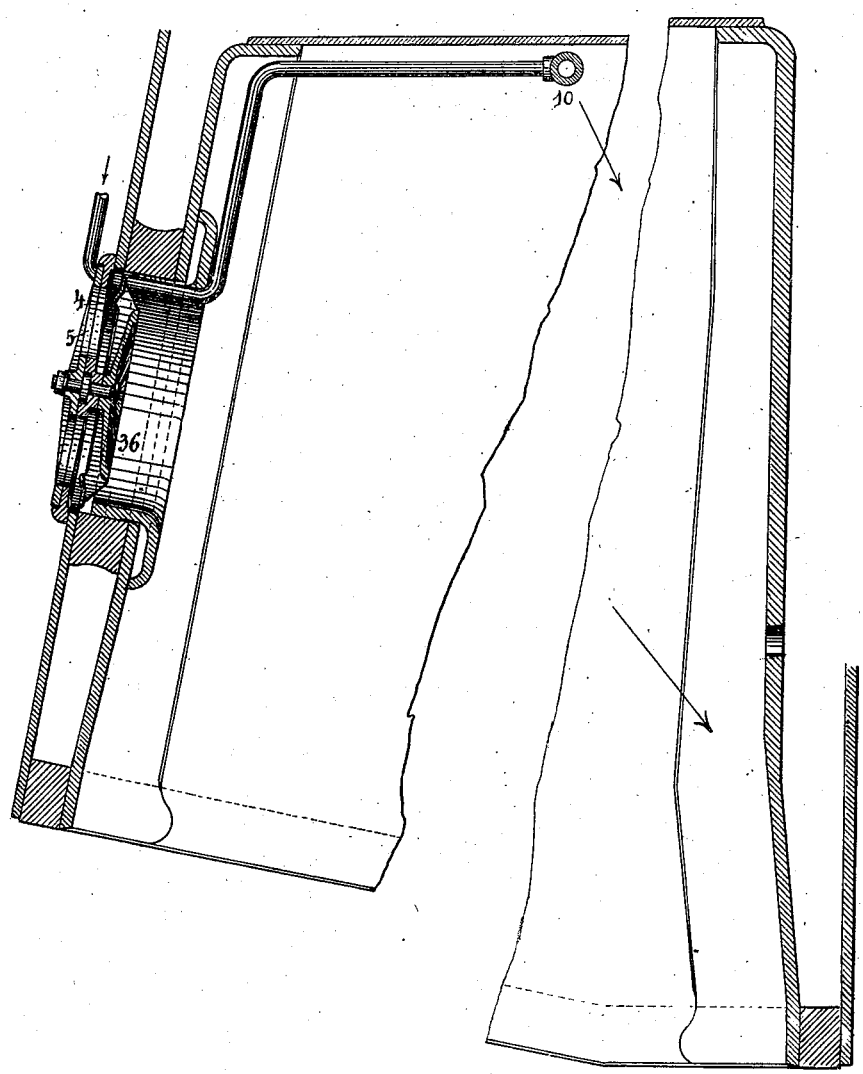
Figure 3:
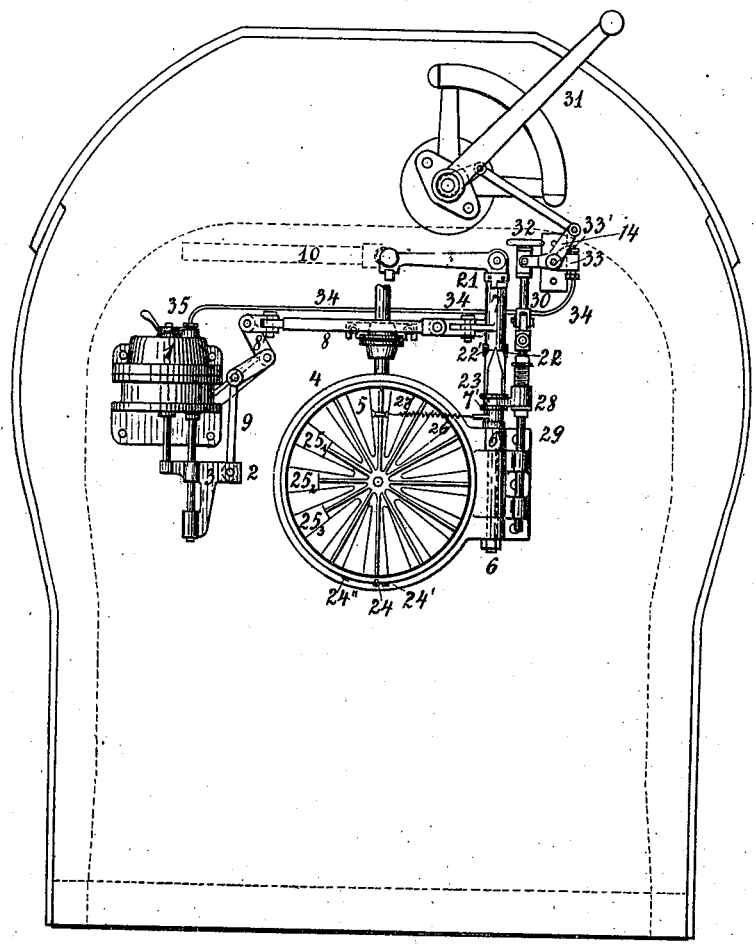
Figure 5:
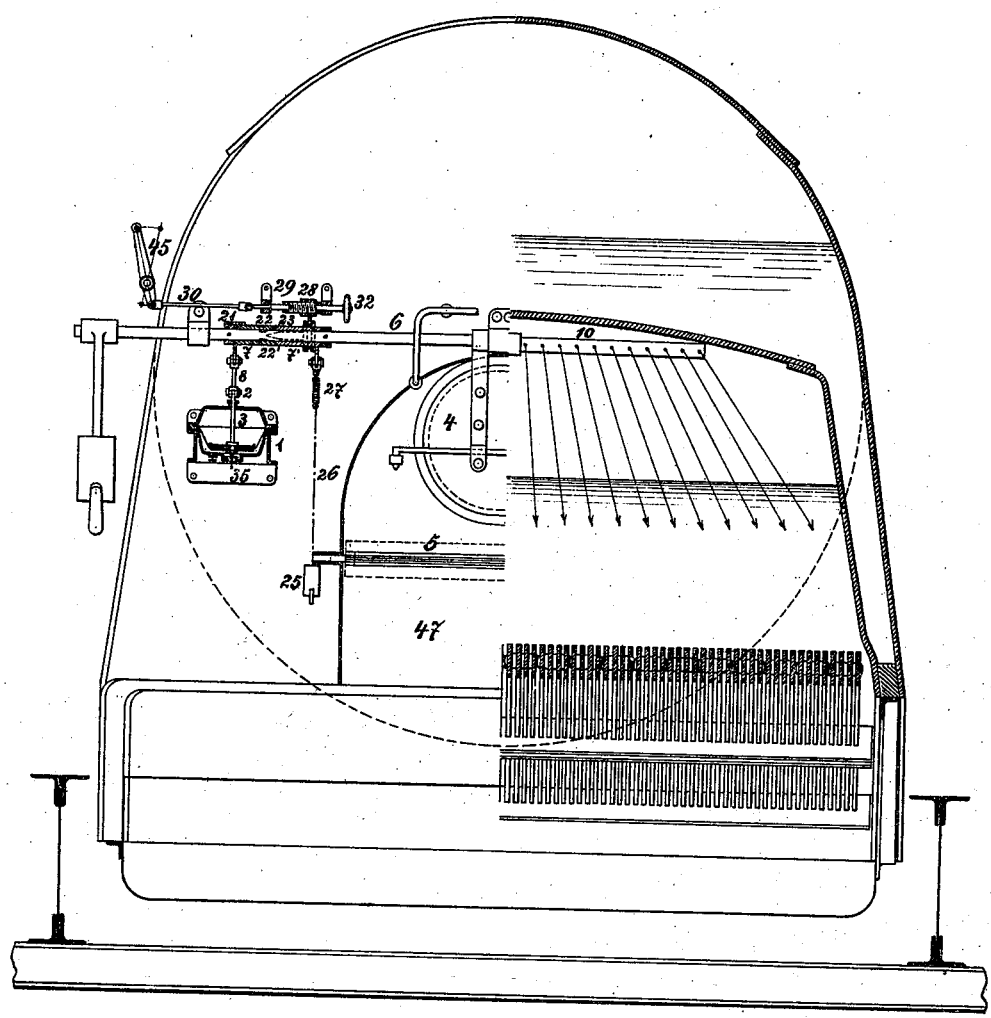
Figure 6:
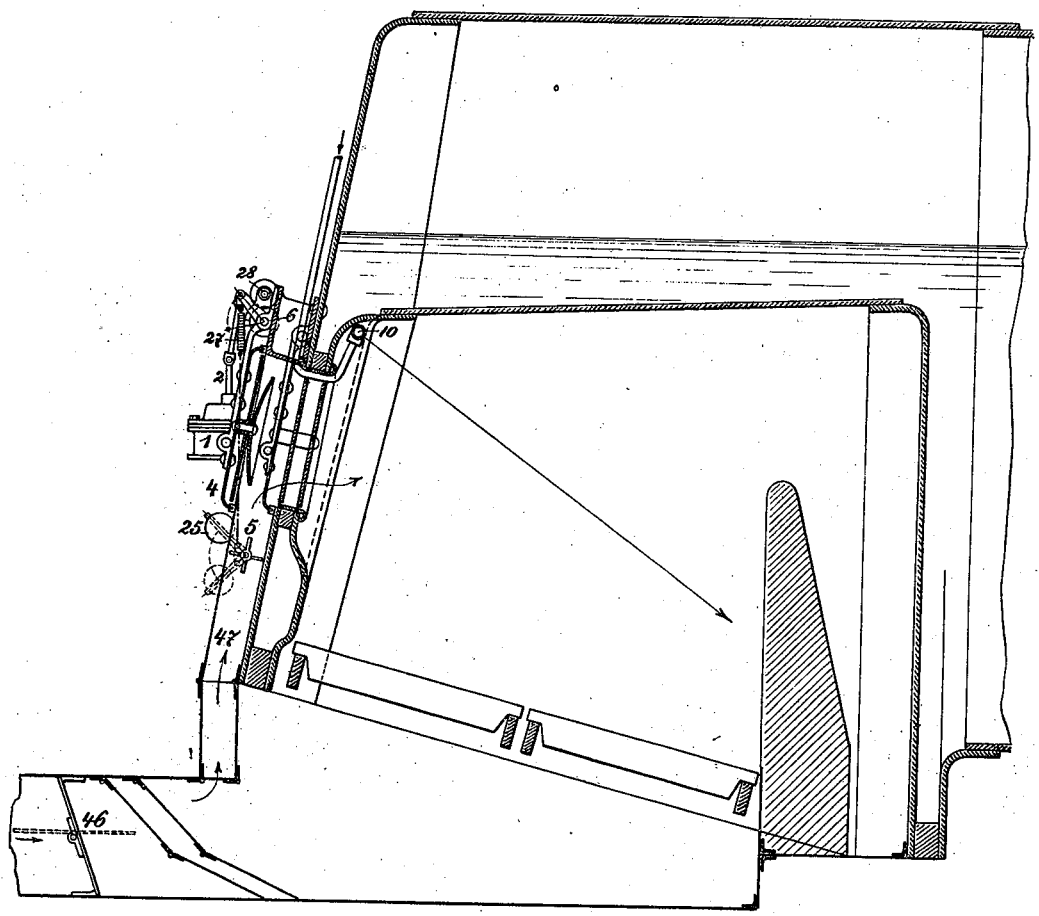

Figure 1 shows my improved apparatus in front elevation attached to the furnace-door of a locomotive-boiler. Fig. 2 is a vertical section through the fire-box of a locomotive-boiler provided with my apparatus. Figs. 3 and 4 represent similar views and sections of the fire-box of a locomotive with a modification of my apparatus. Fig. 5 shows my apparatus in front elevation as applied to a marine boiler. Fig. 6 is a vertical section through the marine boiler provided with my apparatus.

In all figures similar characters indicate corresponding or equivalent parts.

Secured at a suitable place outside the boiler-furnace is an air-regulating apparatus 1, Figs. 1 to 6, consisting of a cataract, as shown, or of a clockwork, &c., which operates in such manner that a part or bracket 3 of the same, carrying an arm, eye, or other means of connection 2, and which part 3 I shall for brevity designate the "operator," will within a certain predetermined time perform a certain stroke. This regulating apparatus is connected to the furnace-door and is operated by the opening or closing thereof. Furnace-door 4 (or its frame-space 47, Figs. 5 and 6) is provided with an air-register 5, consisting of a slide or door, which is by preference connected with regulating apparatus 1 in such manner that by the up or inward stroke of the piston or of the part or operator 3 of regulator 1 the register 5 will be opened to a certain degree, and gradually closed again by the slow down or return stroke of the regulator-piston or the bracket.

Above the air-inlet into the chamber above the grate is placed a steam-pipe 10, Figs. 5 and 6, provided with a number of smoke-holes. This pipe 10 extends inside the fire-box and along its front side. The steam emitted from the perforations in this pipe forms a mist above the burning fuel and mixes the air entering through the fire-door above the grate with the fire-gases, whereby a combustion of the smoke is effected. The area necessary for the air-passage after the feeding of the furnace, as well as the time after which the admission of air is to be stopped, must be determined by observation, according to which the regulator is adjusted.

Figure 4:
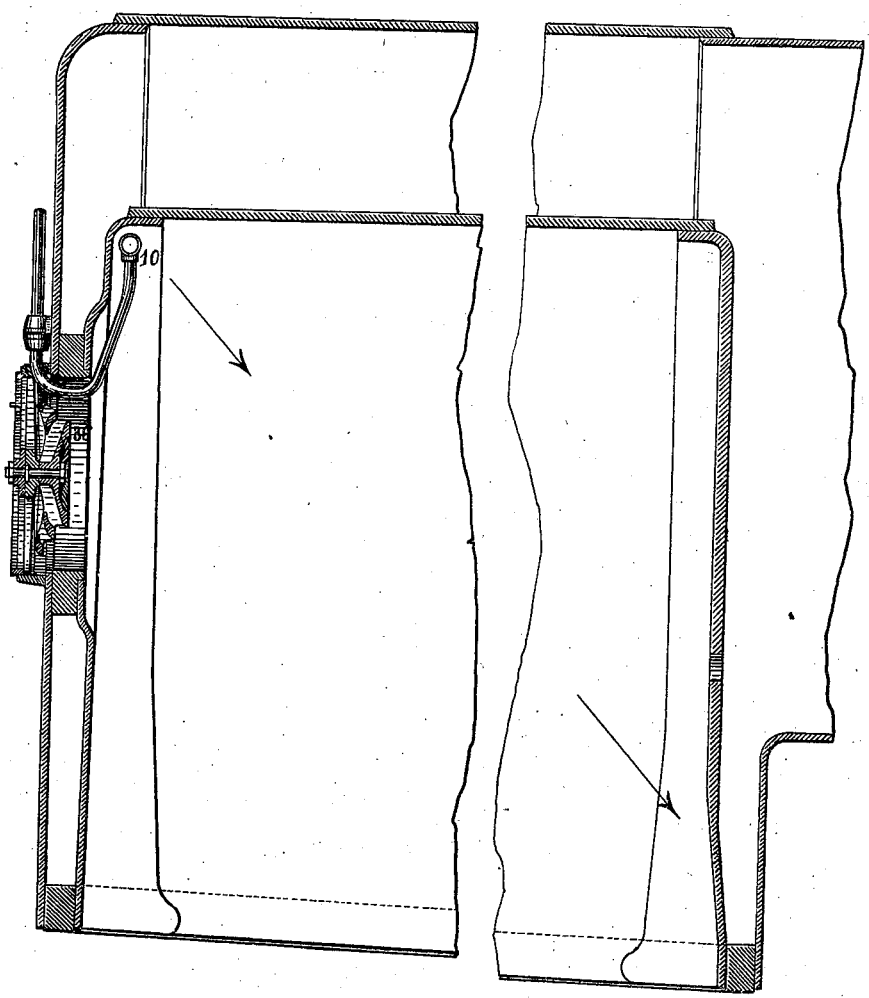

In locomotive-boilers the steam-pipe 10 is by preference placed above the furnace-door opening in the front part of the fire-box, Figs. 1 and 2, or near the furnace-door at the top of the fire-box, as shown in Figs. 3 and 4. The perforations in the steam-pipe 10 are drilled in such a manner that the steam-jets will strike the tube partition of the boiler somewhat below the tubes, as indicated by the arrows in Fig. 2. Although it is advisable to let the steam-jets or mist operate continuously, it is within the scope of this invention to insert a valve 44, Fig. 1, in the steam-pipe, which valve is operated and adjusted by the movement of the air-regulating apparatus. As a matter of course two or more steam-pipes may be employed instead of one. In certain constructions of furnaces the operation of the draft frequently varies. This is, for instance, the case in locomotive-boilers, where the exhaust of the engine produces an artificial draft, while when the engine is stopped or the locomotive-engine is running empty as a rule only the natural draft of the furnace is in operation. In the former case, after the feeding of the furnace less air will be required to be introduced in order to effect a complete combustion of the smoke-gases and the supply of air will have to be cut off at an earlier period than in the latter case. In order to easily secure the proper adjustment of the regulating apparatus in general and especially in such particular cases, the mechanism is so arranged that only the absolutely necessary part of the movement of the regulating apparatus, adjusted to a certain stroke, will be imparted to the register 5 or catch 5'. In the construction shown in Figs. 1 and 2 this is effected by the shifting of the position of the axis 11 of a bell-crank lever 12, which serves to establish connection between the regulating apparatus and the register of the furnace-door. Axis 11 of bell-crank lever 12 is situated upon a lever 13, which latter is adjustable by means of a screw 16. As axis 11 is in this manner approached or removed from the operator 3 of the regulator, less or more way is imparted to the register.

The connection between the register and the operator 3 of the regulating apparatus is as follows: The sliding rod 9 is provided with an adjustable stop 15, whereby it is lifted by the operator. The other end of sliding rod 9 is connected to one arm of bell-crank lever 12, from the other arm of which extends a connecting-rod 8 to a loose sleeve 7' upon the pivot of the furnace-door. The sleeve 7' communicates with a second sleeve 7 upon the same axis, which again transmits the movement by a rod 17 to the register 5 upon the furnace-door. The connection between the two sleeves 7 and 7' will be described farther on. The piston of cataract 1 is here raised in opening the furnace-door by means of a chain 20, which connects the furnace-door with operator 3. When the door is closed again, the chain 20 becomes slack and the operator 3 is free to sink back in the time to which the cataract has been adjusted.

In Figs. 3 and 4, as well as in Figs. 5 and 6, operator 3 of the regulating apparatus is raised in the following manner: The sleeve 7, which is loosely placed upon axis 6 of the furnace-door, is, when said door is opened, caused to rotate with said axis by a lug 21, attached to the latter. The sleeve 7 is connected by rod 8 with a bell-crank lever 8', the other arm of which is coupled with the operator 3 by the rod 9. In closing the furnace-door the lug 21 returns with the axis 6 into its former position, leaving the sleeve 7 to be turned back by the return stroke of operator 3. Below the sleeve 7 is placed a second sleeve 7', which is connected with a register 5 upon the furnace-door in Fig. 1 or upon the box 47, as in Figs. 8 and 9. Each of these two sleeves is provided with a projection or lug 22 and 22', respectively. One of the two sleeves—in the present case the lower one—is provided with an adjustable wedge 23, which wedge, when moved from the outside, may be shifted in any direction upon the sleeve. According to how far this wedge is pushed between lugs 22 and 22' the upper sleeve 7 will impart more or less of its rotary movement to lower sleeve 7'. Register-plate 5 is provided with a stop 24, against which a counterstop 24', when in its free state, is pressed by a counterweight 25. In this position the openings in the furnace-door for the admission of air are closed. By means of a suitable connection 26 the movement of lower sleeve 7' is transmitted to register 5. If a spiral spring 27 is interposed in this connection strong enough to remain unaffected by counterweights 25, and if a second counterstop 24" is provided for arresting the register-plate 5 when the complete opening of the air-entrances has been effected, spiral spring 27 will be tightened if wedge 23 is pushed in as far as it will go, or nearly so, the lever of lower sleeve 7' being long enough, and register 5 will remain wide open during a longer or shorter part of the time occupied in the downstroke of the cataract, according to the position of wedge 23.

As in locomotives the artificial draft begins to act when the engine is started by the opening of the steam-entrance valve, wedge 23, instead of being operated by hand, may be connected with valve-lever 31 by means of a dog 28 and suitable connecting-gear 29 and 30. In marine boilers this connection may be made with lever 45 of the under grate-draft regulator 46. The distance of lugs 22 and 22' must be such that when wedge 23 is in its lowest (farthest receded) position the steam-entrance valve of the engine being open, none or only the least necessary part of the stroke of the regulator will be transmitted. The width of wedge 23 is such that when the same is fully pushed in, register 5 will be completely closed when operator 3 is at rest. Dog 28 is attached to rod 29 by means of a screw-thread, so that by turning a hand-wheel 32, with which said rod is provided, dog 28 may, at will, be adjusted to the proper position for producing the necessary opening of the register when the steam-entrance valve is opened. By the closing of this valve, by means of its lever 31, wedge 23 is pushed in farther between lugs 22 and 22', and thereby the required greater transmission of the movement of the cataract to the register is effected. If cataract 1 is still performing its downstroke, and if the steam-valve of the engine is closed during this stroke, as a matter of course register 5 will be opened afresh or wider, respectively, and by giving the suitable dimensions to the arm of the lower sleeve 7' this reopening of register 5 may be enlarged at will, whereby the disagreeable smoking of the locomotive after the closing of the steam-entrance valve is prevented. As, when the engine is working, the artificial draft produced by the exhaust will cause a more intense combustion and a more rapid ascension of smoke-gases from the burning fuel than when the engine is at rest or running empty, it will be advantageous to have the regulator or cataract perform its downstroke somewhat quicker when the steam-entrance valve is open and somewhat slower when said valve is closed. This is effected by causing a slight braking of the air-regulator or cataract by the closing of the steam-entrance valve.

In the construction represented in the drawings an air-regulator or cataract is employed, the construction of which I have made the subject of a special and separate patent application, filed January 19, 1893, Serial No. 458,990. In this apparatus 1 a piston is made to ascend by the opening movement of the furnace-door, whereby the air is forced from (or drawn into) the apparatus through a relief-valve 35, Figs. 5 and 6, while when the furnace-door has been closed again the piston to which operator 3 is attached will descend in proportion to the air admitted through a regulating-screw 33 into the apparatus. In order to effect the before-mentioned braking of the regulator-movement the apparatus is provided with an air-inlet pipe 34, terminating near lever 14, which is connected with operating-lever 31 of the steam-entrance valve. There the free end of pipe 34 is provided with the air-regulating screw 33, and a suitable cover or stop 33' is attached to lever 14 in such manner that, when the steam-entrance valve is closed, cover 33' will reduce the quantity of air admitted by regulating-screw 33, whereby the movement of apparatus 1 is slackened. As a matter of course this slackening or braking depends upon the kind of regulating apparatus employed and by the closing of the steam-entrance valve the auxiliary blast of the locomotive may also be brought to be operated by the regulator. This, however, will be found unnecessary in most cases.

It is further a matter of course that the details of the devices described may be varied in construction without departing from the spirit of my invention. The supply of air to be introduced into the furnace, instead of passing through the furnace-door, may be effected by any other suitable entrance. In boilers where the furnace-door is provided with a register the guard-plate 36 (shown in Fig. 4) may be made in form of steps or tiers in order to secure a good air-passage and at the same time to protect the door against the radiant heat. The perforated steam-pipe 10 should by preference be placed so that the jets, as has already been said, will strike the tube partition below the openings of the tubes. These jets, however, should not be situated in a level plane, but in a conical, cylindrical, or slanting surface, so that the line of intersection of this surface, with the tube partition will form a curve which runs approximately parallel with the curve formed by the lowest row of tubes.

Having thus described the nature and objects of my invention, what I claim as new, and desire to secure by Letters Patent, is—

1. In a smoke consuming apparatus, an air regulating device of the character described, adapted to control the admission of air into a furnace above its grate surface, in combination with a slide register in the furnace-door, an arm secured to said slide and to a loose sleeve on the axis of said door, and with a similar sleeve connected with the air regulator and operated thereby and adapted to operate the other loose sleeve and through its connections the slide in the furnace door, substantially as and for the purposes set forth.

2. In a smoke consuming apparatus, an air regulating device of the character described adapted to control the admission of air into a furnace above its grate, a furnace door provided with openings controlled by slides, and with superposed plates for protecting said slides from the heat of the furnace, in combination with an arm secured to said slides and to a loose sleeve on the axis of said door and with a similar sleeve connected with the air regulator and operated thereby and adapted to operate the other loose sleeve and through its connections the slides in the furnace door, substantially as and for the purposes set forth.

3. The combination of the air regulator, its operating arm, sliding rod, bell crank lever and connecting-rod, with a furnace-door, its slides and shaft, a wedge and collar movable on said shaft and connected with said slides, means for moving said collar on said shaft to secure the same to or release it from said shaft, all arranged so that said operating arm through said sliding rod, bell crank and connecting-rod is adapted to rotate said shaft to open or close said door and said shaft when said wedge is moved thereon, to lock said collar to said shaft adapted to operate said slides, substantially as and for the purposes set forth.

4. The combination of the air regulator, its operator-arm, sliding-rod, bell-crank lever and connecting-rod, with a furnace door, its slides and shaft, a wedge and collar movable on said shaft and connected with said slides, and a lug engaging said collar and carried by a screw-shaft adapted to be operated by a hand-wheel, said lug adapted to move said collar and wedge on the door shaft to secure the same to or release it from said shaft, all arranged so that said operator-arm, through said sliding-rod, bell-crank and connecting-rod is adapted to rotate said shaft to open or close said door, and said shaft when the wedge is moved thereon to lock said collar to said shaft adapted to operate said slides, substantially as and for the purposes set forth.

5. The combination, in a smoke consuming apparatus, of the air regulator and its operator-arm, the furnace door and its slides controlled thereby and adjusting mechanism for transmitting the motion of said regulator operator-arm to said slides, with a brake-mechanism interposed between said adjusting-mechanism and said air-regulator to retard the regulating movement of said operator-arm when the adjusting mechanism is set for reduced draft, substantially as and for the purposes set forth.

In witness whereof I hereunto set my hand in presence of two witnesses.

THEODOR LANGER.

Witnesses:
 VICTOR TISCHLER,
 FERDINAND SATTLER.